Feb. 14, 1928.

J. W. HEINEY 1,658,923

TANK MOUNTING

Filed July 29, 1927

Inventor
JOHN W. HEINEY
By his Attorneys
Redding, Greeley, O'Shea & Campbell

Feb. 14, 1928.
J. W. HEINEY
1,658,923
TANK MOUNTING
Filed July 29, 1927
2 Sheets-Sheet 2
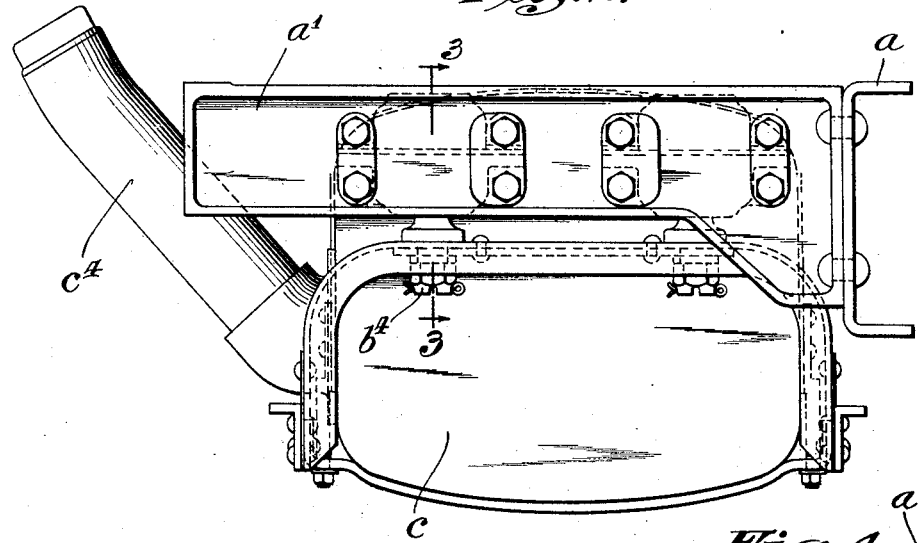
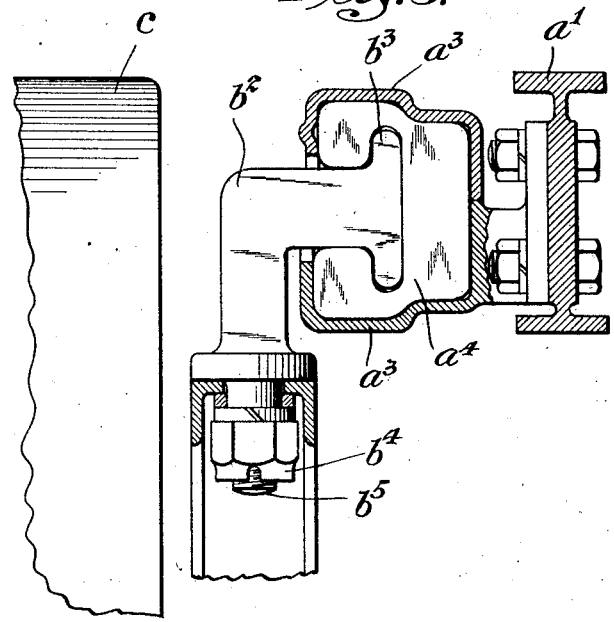
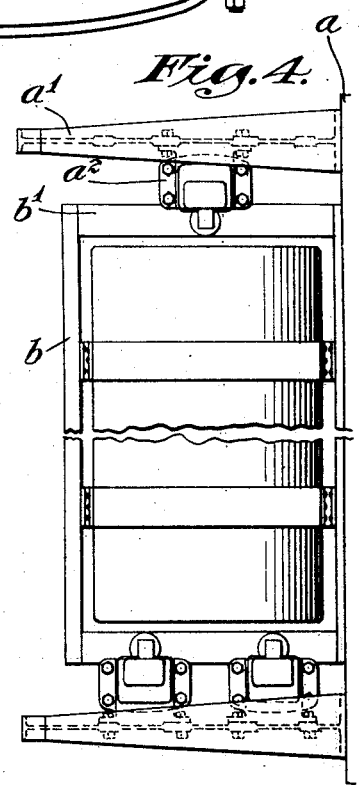
Inventor
JOHN W. HEINEY
By his Attorneys Patented Feb. 14, 1928.

1,658,923

UNITED STATES PATENT OFFICE.

JOHN W. HEINEY, OF ALLENTOWN, PENNSYLVANIA, ASSIGNOR TO INTERNATIONAL MOTOR COMPANY, OF NEW YORK, N. Y., A CORPORATION OF DELAWARE.

TANK MOUNTING.

Application filed July 29, 1927. Serial No. 209,200.

The present invention relates to mountings for tanks and particularly to the mounting of a tank upon a vehicle. In this connection it may be stated that there are forms of mountings now in use, which strive to provide a means for securing a tank, such as a gasoline tank, upon the vehicle frame to prevent the weaving of the frame from affecting the tank.

An object of the present invention, therefore, is to provide a mounting of the above type which is designed to isolate, completely, the tank from the frame, and yet to secure them together in operative relationship, so that the usual gas line connection may be made and preserved in operative condition.

It is highly desirable that the gasoline tank be accessible and yet not projecting from the vehicle so that it may be properly protected. Particularly in large busses, does this question arise and in addition to satisfying this condition, the mounting must be extremely strong and durable. A further object, therefore, is to provide a mounting which is both strong and located within the general contour of the vehicle to be protected thereby, in addition to being located at a convenient and accessible spot.

Further and other objects will appear in the following description and reference will now be had to the accompanying drawings forming a part hereof for a more detailed description of the invention, wherein:

Figure 2 is an end elevation of the mounting shown in Figure 1.

Figure 3 is a section taken on line 3—3 of Figure 2 and looking in the direction of the arrows.

Figure 4 is a plan view of the tank mounting.

Figure 1:
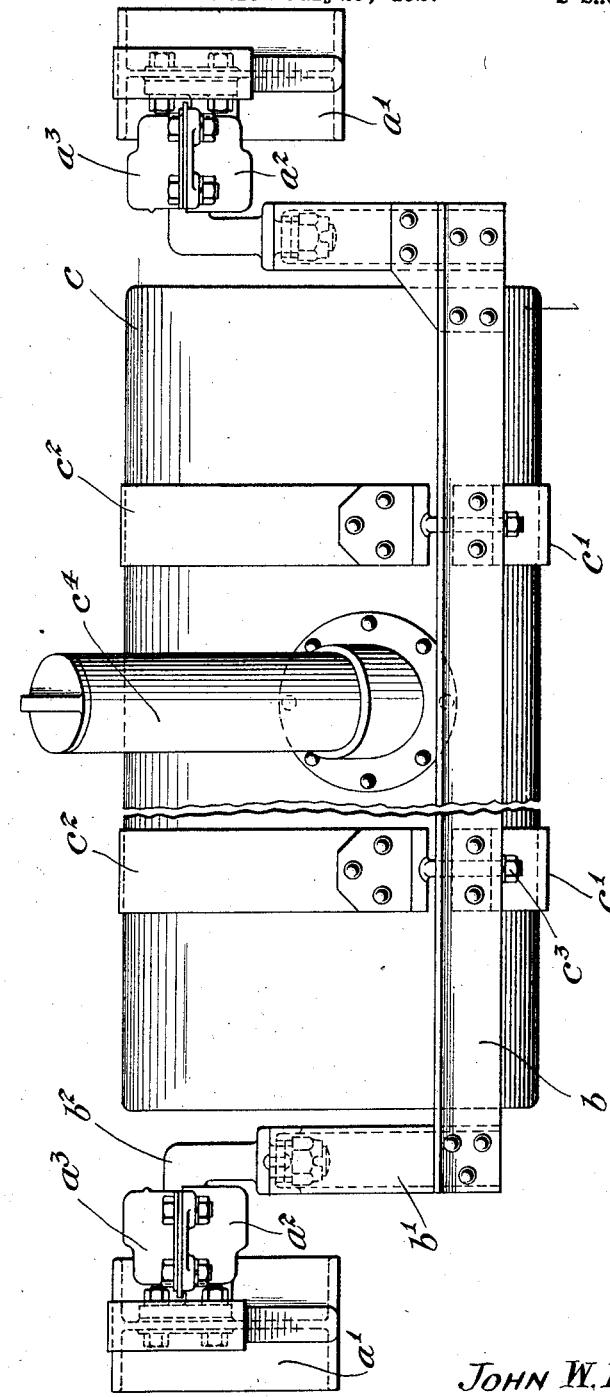
Figure 1 is a front elevation of the tank mounting, showing the manner in which the tank is carried upon the cradle, and the manner of securing the cradle to the outriggers.

Referring to the drawings, $a$ designates the frame of the vehicle upon which the tank is to be mounted. Secured to the frame, as by rivets, are outriggers $a'$ of suitable construction and carrying housings $a^2$. These housings are provided with caps $a^3$ in order that a block of yielding non-metallic material $a^4$, such as rubber, may be secured therein. A cradle composed of longitudinal members $b$ and transverse members $b'$ is supported upon the outriggers through a non-metallic connection provided by the block $a^4$. This connection is effected by means of angular brackets $b^2$, the ends of which are flanged as at $b^3$ and secured within the block $a^4$. At the other ends of these brackets, studs $b^5$ are provided to pass through the transverse members $b'$ and nuts $b^4$ secure the brackets $b^2$ to the transverse members.

As shown in Figure 4, the cradle carries one of these brackets on one transverse member, and two on the other. This construction provides the desirable three point support and relieves the cradle from many of the stresses due to weaving of the frame and vehicle. The transverse members $b'$ are formed as U-shaped members, being inverted and secured to the longitudinal members at their lower extremities. The brackets $b^2$ are secured to the bridge portions thereof to cause the cradle to be slung below the level of the outriggers and thus position the tank in the most desirable manner.

A tank $c$, of any desirable form, is secured to the longitudinal members of the cradle by means of bed straps $c'$, upon which the tank rests, and saddle straps $c^2$ which clamp the tank upon the bed straps by means of adjustable nuts $c^3$. The tank may be provided with the usual filler spout $c^4$ formed to facilitate the filling of the tank when it is positioned under the body, or in other inaccessible positions.

From the foregoing it will be seen that the mounting shown in the accompanying drawings provides a construction in which the tank is securely carried upon the vehicle frame and protected from stresses which tend to weaken it and result in a leaky condition thereof. Although the invention has been described with reference to the specific embodiment shown in the accompanying drawings, it is not to be limited, save as defined in the appended claims.

What I claim is:

1. A device of the character described comprising a vehicle frame, outriggers secured thereto, a tank, longitudinal cradle members secured to the tank, transverse cradle members, and non-metallic connecting means between the transverse members and the outriggers, said connecting means securing the tank below the level of the outriggers.

2. A device of the character described comprising a vehicle frame, outriggers secured thereto, a tank, longitudinal cradle members secured to the tank, transverse cradle members formed as inverted U pieces and fastened at their ends to the longitudinal members, a single non-metallic connection between one of the transverse members and an outrigger and a plurality of connections between the second transverse member and another outrigger.

3. A device of the character described comprising a vehicle frame, outriggers secured thereto, a tank, longitudinal cradle members secured to the tank, transverse cradle members formed as inverted U pieces and fastened at their ends to the longitudinal members, a single L-shaped bracket secured to one of the transverse members, a pair of L-shaped brackets secured to the other member, and means to secure the brackets to the outriggers through wholly non-metallic and yielding connections.

This specification signed this 25" day of July, A. D. 1927.

JOHN W. HEINEY.